W. S. SAMSON.
MOUNTING FOR EYEGLASSES AND SPECTACLES.
APPLICATION FILED APR. 6, 1910.

963,653.

Patented July 5, 1910.

Witnesses

Inventor
William S. Samson
By Victor J. Evans
Attorney

UNITED STATES PATENT OFFICE.

WILLIAM STANLEY SAMSON, OF LANCASTER, OHIO.

MOUNTING FOR EYEGLASSES AND SPECTACLES.

963,653.  Specification of Letters Patent.  Patented July 5, 1910.

Application filed April 6, 1910. Serial No. 553,750.

*To all whom it may concern:*

Be it known that I, WILLIAM S. SAMSON, a citizen of the United States, residing at Lancaster, in the county of Fairfield and State of Ohio, have invented new and useful Improvements in Mountings for Eyeglasses and Spectacles, of which the following is a specification.

This invention relates to mountings for eye-glasses and spectacles and relates more particularly to means for securely fastening the lenses to the mounting.

The principal object of the invention is the provision of an improved screw especially adapted for the purpose mentioned which has teeth, corrugations or the like on the under side of its head to mesh with the corresponding teeth, corrugations or the like on the stud to which the lens is attached, whereby the screw after being driven home will be prevented from loosening by unscrewing.

With such objects in view, and others as will appear as the description proceeds, the invention comprises the various novel features of construction and arrangement of parts which will be more fully described hereinafter and set forth with particularity in the claim appended hereto.

Figure 1:
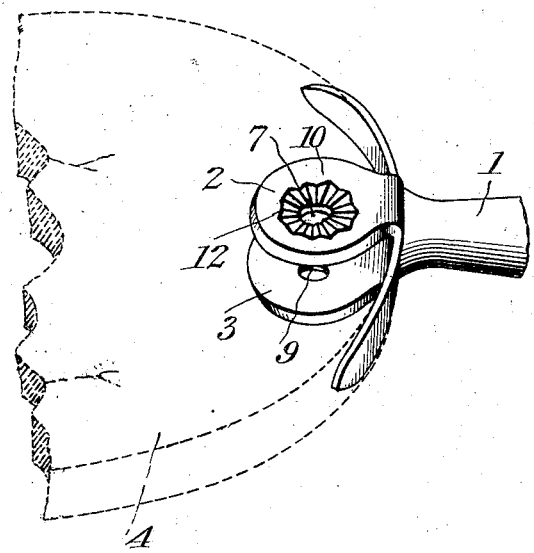
Figure 2:
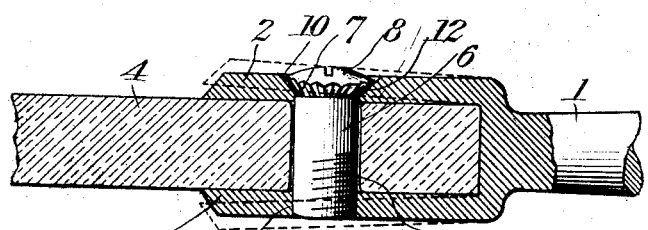
Figure 3:
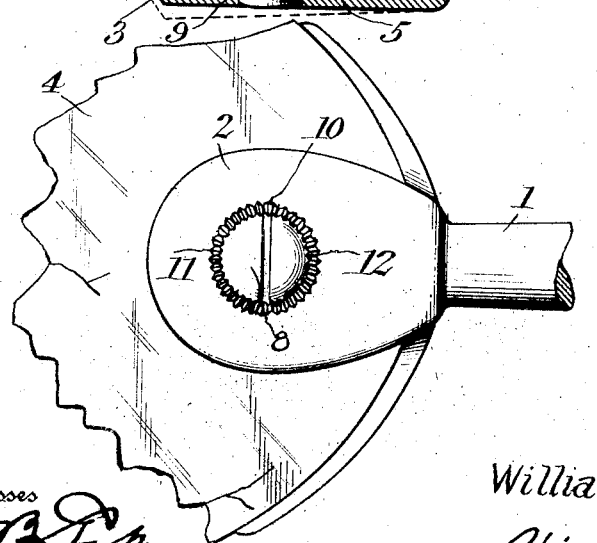

In the accompanying drawing, which illustrates one embodiment of the invention; Figure 1 is a perspective view of a portion of an eye-glass mounting with the lens and screw detached. Fig. 2 is a detail sectional view showing the lens secured to the mounting. Fig. 3 is a plan view of Fig. 2.

Similar reference characters are employed to designate corresponding parts throughout the several views.

Referring to the drawing, 1 designates a stud of a spectacle or eye-glass mounting, which has spaced members or jaws 2 and 3 between which the lens 4 is clamped, the lens having the usual screw opening 5 through which passes the screw 6. The member 2 has an opening 7 that is deeply countersunk for receiving the head 8 of the screw, and the member 3 has a threaded opening 9 into which the shank of the screw engages. The countersunk portion 10 of the opening 7 is provided with teeth or corrugations 11 and the frusto-conical portion 12 of the screw head 8 is provided with teeth or corrugations to correspond with the teeth or corrugations 11 so as to interlock therewith when the screw is driven home for the purpose of preventing unscrewing or loosening of the screw.

In applying the lens, the same is inserted between the members 2 and 3 and adjusted until the opening 5 registers with the openings of the said members, and then the screw is inserted in these registering openings and the lower end of the screw is engaged with the threads of the opening 9 by turning the screw. As the screw tightens, the members 2 and 3 are drawn together and placed under tension and during the last part of the turning movement of the screw, the teeth or corrugations thereon will ride freely over the teeth or corrugations in the countersink of the opening 7, and when the screw is turned as tight as it can be, the said teeth or corrugations will interlock and prevent the screw from loosening by turning backwardly. When the screw is thus drawn as tight as possible, the lower member 3 tends to spring downwardly and carry the screw with it, while the upper member 2 tends to spring upwardly so that the tension of the two members assists in maintaining the interlocking engagement between the teeth or corrugations on the head of the screw and the socket into which it enters. By making the socket or countersink deeper than the head of the screw requires, a circular border of corrugations or teeth will be exposed around the head of the screw and thus the purchaser can see at a glance that he is receiving a pair of glasses or spectacles having the anti-loosening screws.

From the foregoing description taken in connection with the accompanying drawing, the advantages of the construction and of the method of operation will be readily apparent to those skilled in the art to which the invention relates, and while I have described the principle of operation of the invention, together with the device which I now consider to be the best embodiment thereof, I desire to have it understood that the apparatus shown is merely illustrative and that such changes may be made when desired as are within the scope of the claim.

What I claim as new and desire to secure by Letters Patent is:—

An eye-glass mounting comprising a stud having spaced resilient members provided with registering openings, one of the openings being countersunk and having serrations and the other provided with screw threads, a lens disposed between the members, a screw passing through the lens and having its ends disposed with the openings of the said members and threaded in one of the said openings, a head on the screw, and serrations on the under side of the head engaging the first mentioned serrations to prevent the loosening of the screw when the latter is tightened, the said members being held under tension to maintain the serrations of the screw engaged with the serrations of the said member.

In testimony whereof I affix my signature in presence of two witnesses.

WILLIAM STANLEY SAMSON.

Witnesses:
H. M. SAMSON,
ROBT. SCHULTZ.